Feb. 16, 1954          E. VAN POOLEN ET AL          2,669,377
           MACHINE FOR PUTTING LIDS ON PULLMAN BREAD PANS
Filed Sept. 29, 1951                                3 Sheets-Sheet 2
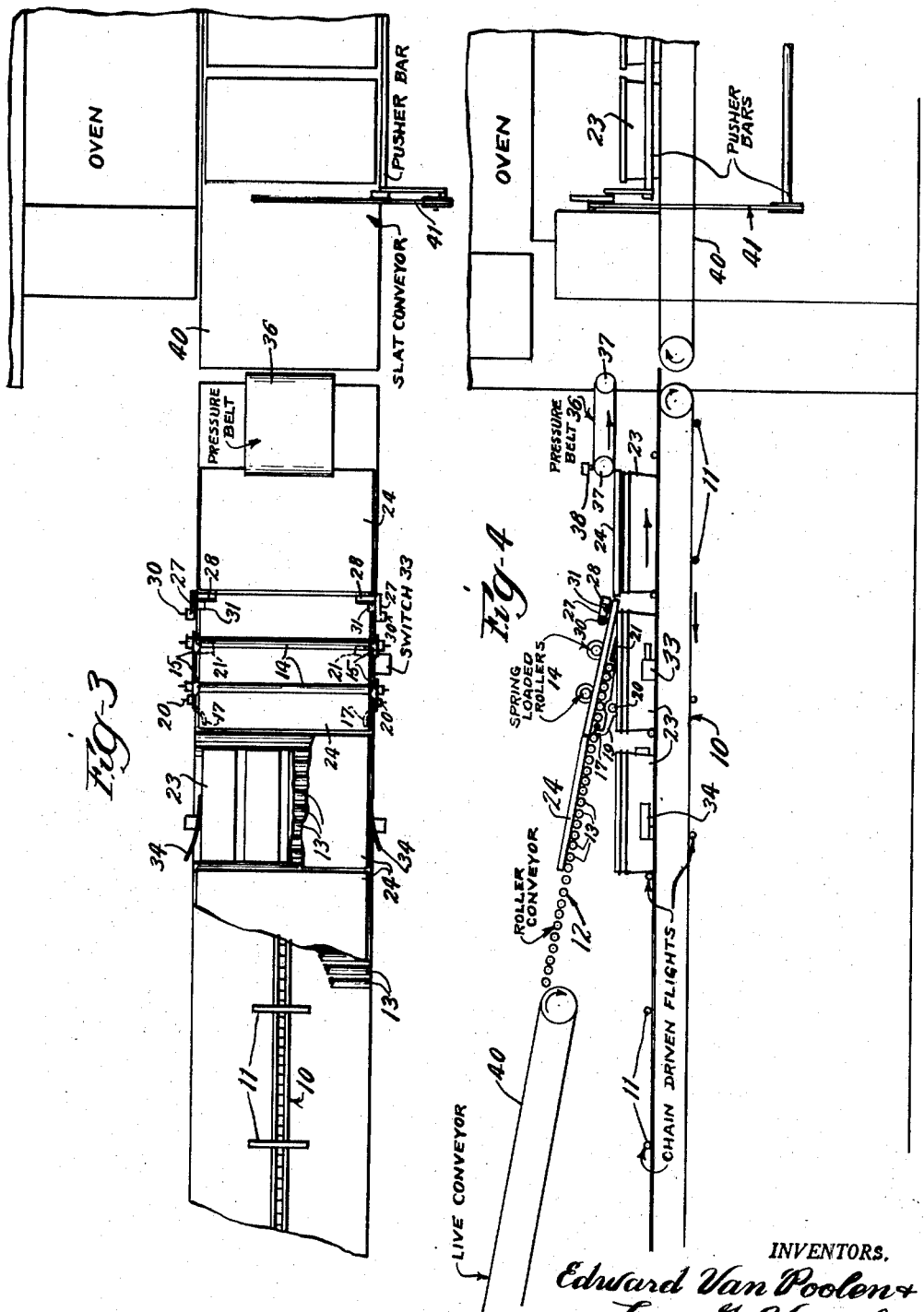
INVENTORS.
Edward Van Poolen +
Leo G. Vogel
By:- Mann, Brown + Hansmann Feb. 16, 1954 E. VAN POOLEN ET AL 2,669,377
MACHINE FOR PUTTING LIDS ON PULLMAN BREAD PANS
Filed Sept. 29, 1951 3 Sheets-Sheet 3
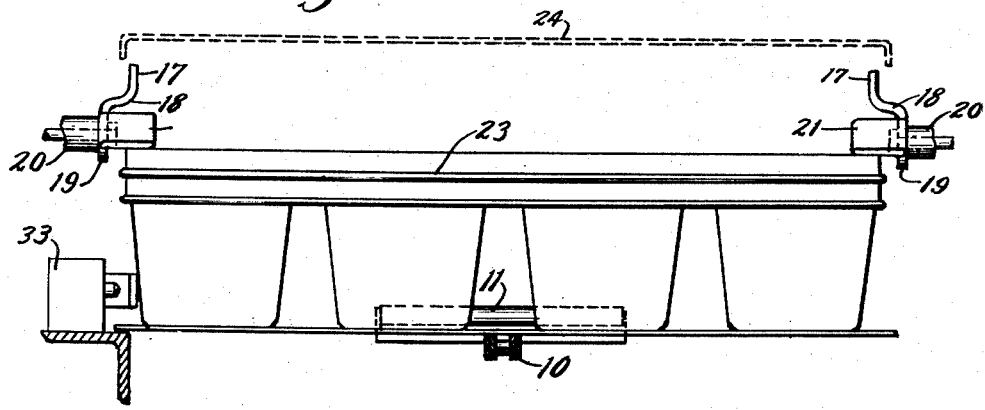
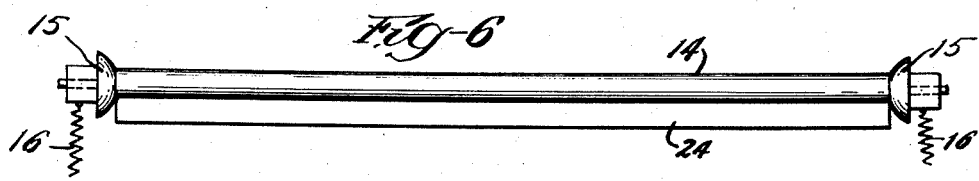
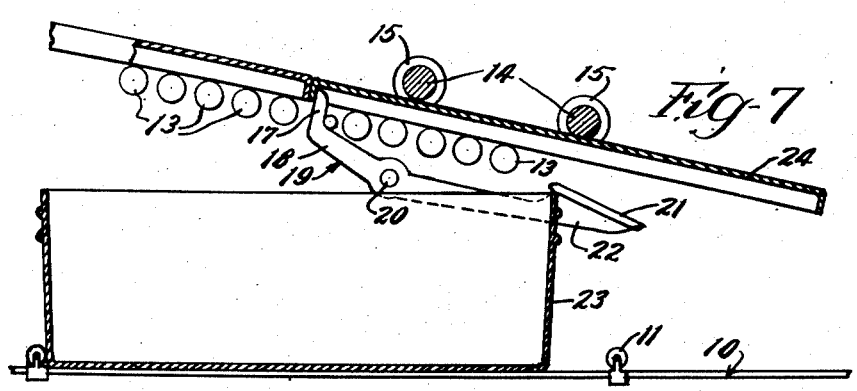
INVENTORS.
Edward Van Poolen &
Leo D. Vogel
By:-
Mann, Brown & Hansmann
Attys.

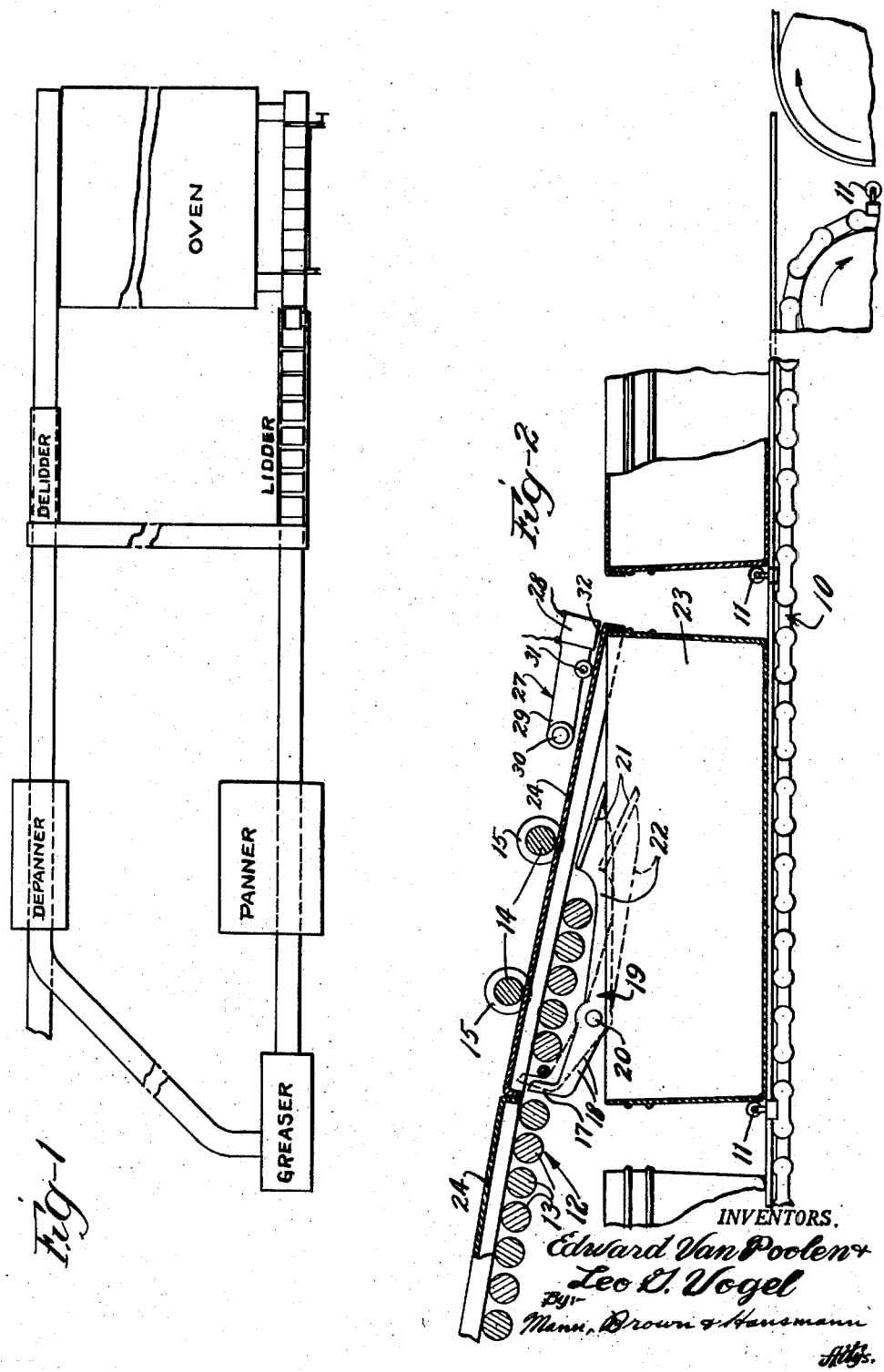

Patented Feb. 16, 1954

2,669,377

UNITED STATES PATENT OFFICE 2,669,377

MACHINE FOR PUTTING LIDS ON PULLMAN BREAD PANS

Edward Van Poolen, Cicero, and Leo G. Vogel, Evanston, Ill., assignors to The W. E. Long Company, a corporation of Illinois Application September 29, 1951, Serial No. 248,938

10 Claims. (Cl. 226—88.1)

This invention relates to machines for putting lids on Pullman bread pans, and has for its principal object to provide mechanism for putting lids on a stream of bread pans as they travel toward an oven.

Generally speaking, this is accomplished by pan conveyor means for producing a continuous moving stream of bread pans charged with dough, lid conveyor means for providing a stream of pans above, inclined to and intersecting the stream of bread pans, and means to check each lid in position to be engaged and carried along with a mating pan.

Other objects and advantages of the invention will appear as the disclosure proceeds and the description is read in connection with the diagrammatic drawings, in which Fig. 1 is a plan view of an oven, a delidder, a depanner, a greaser, a panner, and a lidder connected in series by conveyors;

Fig. 2 is an enlarged side elevation, partly in section, illustrating the juncture of the pan conveyor and the lid conveyor and its associated mechanism for insuring the proper assembly of lids and pans;

Fig. 3 is a plan view of a smaller scale than Fig. 2, and showing a more extensive portion of the mechanism;

Fig. 4 is a side elevation of Fig. 3;

Fig. 5 is a cross-section of the pan conveyor with the pan in position to release the stop for a lid;

Fig. 6 is an elevation of one of the pressure rollers associated with the lid delivery conveyor; and Fig. 7 is a side view, partly in section, corresponding to Fig. 2, but showing the parts in the position they assume when one or more pans is missing on the pan conveyor followed by a pan in condition to receive a lid.

In Fig. 1, the general relation of the devices as they may be arranged in a bakery will be apparent from the legends without reference numerals.

The pan conveyor for moving bread pans charged with dough toward the oven is shown generally at 10 provided with roller flights 11 to make spaces for receiving the pans in a series and to positively move the pans to the right in Figs. 2, 3, 4, and 7. That conveyor is to be power driven at suitable speed, depending on the conditions.

The lid conveyor, generally indicated by 12, is shown as made up of a series of rollers 13, which may be gravity propelled or so-called live rollers, or any other suitable form, driven at a speed suited to bringing the lids into position for engagement by pans on the conveyor. The lid conveyor is above and at an angle to the pan conveyor, the degree of which will depend somewhat upon the structure of the pans and lids. That relation, shown in Figs. 2, 4, and 7, may be considered as typical.

Above the delivery end of the lid conveyor, rollers 14 are arranged to cooperate with the lid as it approaches and while in the position to be engaged by a pan on the pan conveyor. Those rollers are provided with flanges 15 (Fig. 6) to guide and center the lids, and they are yieldingly held downward by springs 16, which hold them normally in the position to press the lid against the rollers of the conveyor 12, but permit it to pivot or swing as the pan takes the lid from the position shown in Figs. 2 and 4 to the right.

Associated with the juncture of the pan and lid conveyors is a stop or detent 17 carried by a short arm 18 of a bent lever, generally indicated by 19, fulcrumed at 20 and provided with an overhanging wing 21 on the long arm 22 for cooperating with a pan 23 on the pan conveyor 10 as it approaches the position to engage a lid 24 on the lid conveyor 12.

The upward movement of the stop or detent 17 may be limited to the position shown in dotted lines in Fig. 2 by an abutment 9.

The stop 17 is in the dotted line position shown in Fig. 2 as the pan 23 approaches the lid 24 and moves to the solid line position as the pan travels to the right, the wing 21 rising over the side of the pan and moving from the dotted line position shown in Fig. 2 to the solid line position shown in that figure. Two stops 17 and levers 19 are shown.

As an alternative or an associate of the stop 17, there are stops 27 each composed of an electromagnet 28 carried by a lever 29 fulcrumed at 30 and equipped with a roller 31 to preserve an air gap 32 between the armature of the magnet 28 and the lid 24.

The solenoid is in circuit with the switch 33, which is normally closed and is opened as the pan 23 moves into lid engaging position, whereby the magnet is de-energized as the pan takes the lid to the right.

Suitable resilient guides 34 are provided on the sides of the conveyor 10 to insure that the pans are properly lined up as they approach lid receiving position.

Beyond the lid receiving position, there is a pressure belt 36 running over spring loaded idler rollers 37 for urging the lids into proper down position on the pans. The idlers 37 are spring loaded, and there is an associated switch 38 which will be closed if a lid does not go down in proper position, and will energize a circuit to provide an audible, visual, or other signal.

The pan conveyor 10 delivers to an oven conveyor or table 40 equipped with pusher mechanism 41 for moving a series of pans 23 into the oven.

In operation, a stream of pans on the conveyor 10 is moving toward the oven and a corresponding stream of lids 24 is moving downwardly on the lid conveyor 12 and intersecting the path of the stream of pans. The detent or stop 17 checks the stream of lids, as indicated in Figs. 2, 4, and 7, with the lowermost lid in position to be engaged by the leading edge of the corresponding pan on the conveyor 10. As the pan approaches lid receiving position, it runs under the wings 21 and moves the bent levers 19 from the dotted to the solid line position shown in Fig. 2. As best shown in this figure, that releases the lowermost lid before the pan has reached the position to engage the lid as shown in Fig. 2; but inertia and the rollers 14 will ordinarily be sufficient to retain the lids until there is actual driving engagement between the pan 23 and the lid 24, as shown in Fig. 2, when they will travel together to the right, rotating the arms 27 upwardly and swinging the rollers 14 upwardly. At about the time the pan and lid approach the position shown at the right in Fig. 4, the lid runs under the pressure belt 36 and is forced down into proper position on the pan. If it fails to do so, the switch 38 will be operated to display the signal.

When the magnetic stop 27 is used in connection with the detent 17, it can be arranged to hold the lid 24 until just about the time the pan 23 strikes the leading edge of the lid. When it is used in place of the detent 17, it will serve to hold the leading lid until there is actual driving engagement between the mating pan and that lid, when the switch 33 should open, but, even if it should not be so adjusted, the levers 27 would swing upwardly and permit the pan and lid to move on to the right.

As shown in Fig. 4, the lid conveyor 12 may be supplied by any suitable conveyor 40 for bringing lids from a suitable source.

It will, of course, occasionally happen that there will be a missing pan in the stream moving toward the oven. When that happens, the mechanical stop 17 and the magnetic stop will not be operated, and the leading lid 24 will remain in position to be engaged by the next succeeding pan. Fig. 7 illustrates the relation of the parts as that pan comes into position following a missing pan.

The means shown and described are thought sufficient to make the principle clear, and it is susceptible of many embodiments. The machine can be made adjustable to suit different sizes of pans and lids.

We claim:

1. In a machine for putting lids on Pullman bread pans, a substantially horizontal conveyor for moving bread pans charged with dough in longitudinally spaced relationship toward an oven, a lid conveyor directed down at an acute angle to the pan conveyor, and a lever pivoted below the lower end portion of the lid conveyor having a rear arm normally engaging a lid to hold it on the lid conveyor and a front arm engageable by a pan to swing the lever and release the lid to move down the lid conveyor, meet said pan and be positioned thereon.

2. In a machine for putting lids on Pullman bread pans, a substantially horizontal conveyor for moving bread pans charged with dough in longitudinally spaced relationship toward an oven, a gravity-actuated lid conveyor directed down at an acute angle to the pan conveyor, and a lever pivoted below the lower end portion of the lid conveyor having a rear arm normally elevated to engage the foremost lid on the lid conveyor and hold it thereon and having a front arm engageable by a pan on the pan conveyor to swing the lever and release said lid to move down the lid conveyor, meet said pan and be positioned thereon as the lid and pan move together.

3. In a machine for putting lids on Pullman bread pans, a substantially horizontal conveyor for moving bread pans charged with dough in longitudinally spaced relationship toward an oven, a roller conveyor directed down at an acute angle to the pan conveyor for delivering to the pan conveyor a stream of lids in end-to-end abutting relationship, and a lever pivoted below the lower end portion of the lid conveyor having a rear arm normally engaging the foremost lid to hold it on the lid conveyor and having a front arm engageable by a pan to swing the lever and release said lid to move down the lid conveyor, meet said pan on further movement thereof on the pan conveyor, and be positioned on the pan as the lid and pan move together.

4. The combination claimed in claim 3 in which the roller conveyor is provided with rollers having peripheral flanges for centering and aligning the lids.

5. The combination claimed in claim 1 in which the forward arm of the lever overbalances the rear arm thereof whereby the forward arm normally hangs by gravity in the path of an oncoming pan.

6. In a machine for putting lids on Pullman bread pans, a substantially horizontal conveyor for moving open bread pans charged with dough in longitudinally spaced relationship toward an oven, a lid conveyor directed down at an acute angle to the pan conveyor for delivering to the pan conveyor a stream of lids in end-to-end abutting relationship, and means for retaining the foremost lid on the lid conveyor and releasing it for further movement in timed relation to movement of the foremost open pan on the pan conveyor comprising stop means normally conditioned to stop said foremost lid and hold it stationary on the lid conveyor and means engageable by said foremost pan on movement thereof to a predetermined position on the pan conveyor for rendering the stop means inoperative so as to release said lid for further movement along the lid conveyor and for engagement by said pan to move therewith in covering relation.

7. The combination claimed in claim 6 in which the stop means is an electromagnet and the means rendering the stop means inoperative is a switch in circuit with the electromagnet and openable by advance of the pan.

8. The combination claimed in claim 6 in which the pan conveyor is constantly driven and in which the lid conveyor comprises idler rollers for advancing the lids by gravity.

9. The combination claimed in claim 6 in which the stop means includes an electrical device and a mechanical device, said electrical device including an electromagnet normally operative on said lid and a switch in circuit with the electromagnet and openable by advance of said pan, and said mechanical device comprising a lever pivoted below the lower end portion of the lid conveyor having a rear arm normally engaging said lid to hold it on the lid conveyor and a front arm engageable by said pan to swing the lever and release the lid to move down the lid conveyor.

10. The combination claimed in claim 6 including a device beyond the stop means for pressing the covering lid on the pan into properly seated position, and electric signalling means for indicating an improperly seated lid comprising a switch positioned beyond the pressing device.

EDWARD VAN POOLEN.
LEO G. VOGEL.

References Cited in the file of this patent

UNITED STATES PATENTS

| Number    | Name       | Date          |
|-----------|------------|---------------|
| 1,964,078 | Podel      | June 26, 1934 |
| 2,304,437 | Bell       | Dec. 8, 1942  |
| 2,386,797 | Hohl et al.| Oct. 16, 1945 |
| 2,433,549 | Enkur et al.| Dec. 30, 1947|